United States Patent
Roh et al.

(10) Patent No.: US 7,220,519 B2
(45) Date of Patent: May 22, 2007

(54) ELECTROLYTE COMPOSITION, LITHIUM BATTERY USING THE SAME, AND METHOD OF MANUFACTURING THE LITHIUM BATTERY

(75) Inventors: Kwon Sun Roh, Cheonan (KR); Jong Hyuk Choi, Seoul (KR); Chi Kyun Park, Montville, NJ (US); Jon Ha Lee, Daejeon (KR)

(73) Assignee: SKC Co., Ltd., Suwon, Kyungki-do (KR)

( * ) Notice: Subject to any disclaimer, the term of this patent is extended or adjusted under 35 U.S.C. 154(b) by 201 days.

(21) Appl. No.: 10/920,163

(22) Filed: Aug. 18, 2004

(65) Prior Publication Data

US 2005/0042520 A1    Feb. 24, 2005

(30) Foreign Application Priority Data

Aug. 19, 2003    (KR) .................... 10-2003-0057275

(51) Int. Cl.
*H01M 6/16* (2006.01)
*H01M 10/08* (2006.01)

(52) U.S. Cl. .................. 429/328; 429/339; 252/62.2

(58) Field of Classification Search ............... 429/328, 429/339
See application file for complete search history.

(56) References Cited

U.S. PATENT DOCUMENTS

| 5,879,834 A | 3/1999 | Mao |
| 6,632,572 B1 * | 10/2003 | Takahashi et al. .......... 429/326 |
| 6,866,966 B2 * | 3/2005 | Hamamoto et al. ......... 429/340 |
| 2005/0042519 A1 * | 2/2005 | Roh et al. ................... 429/330 |

FOREIGN PATENT DOCUMENTS

| JP | 05-036439 | 2/1993 |
| JP | 09-017447 | 1/1997 |
| JP | 09-106835 | 4/1997 |
| JP | 2001-015155 | 1/2001 |

* cited by examiner

*Primary Examiner*—Mark Ruthkosky
(74) *Attorney, Agent, or Firm*—Nixon & Vanderhye, PC

(57) ABSTRACT

An electrolyte composition, a lithium battery using the electrolyte composition, and a method of manufacturing the lithium battery are provided. The electrolyte composition contains: a lithium salt; an organic solvent containing 15-50% by weight of propylene carbonate based on the total weight of the electrolyte composition; a nitrogen-containing compound; and cyclohexylbenzene. The lithium battery manufactured using the electrolyte composition has improved stability even when overcharged and improved cycle characteristics.

11 Claims, No Drawings

ELECTROLYTE COMPOSITION, LITHIUM BATTERY USING THE SAME, AND METHOD OF MANUFACTURING THE LITHIUM BATTERY

BACKGROUND OF THE INVENTION

This application claims the priority of Korean Patent Application No. 2003-57275, filed on Aug. 19, 2003, in the Korean Intellectual Property Office, the disclosure of which is incorporated herein in its entirety by reference.

1. Field of the Invention

The present invention relates to an electrolyte composition, a lithium battery using the same, and a method of manufacturing the lithium battery, and more particularly, to an electrolyte composition with improved stability in the case of overcharging, a lithium battery using the electrolyte composition, and a method of manufacturing the lithium battery.

2. Description of the Related Art

As an increasing number of electronic devices, especially, portable devices such as personal digital assistants (PDAs), mobile phones, notebook computers, etc. spreads widely and become used in more application fields, there has been intensive research on batteries as driving sources for such devices with the need for smaller, thin design, lightweight, high-performance batteries.

Among various kinds of batteries lithium batteries have been used as typical driving power sources for portable devices due to the lightweight and high energy density thereof. A lithium battery consists of a cathode, an anode, a separator, and an electrolyte solution interposed between the cathode and the anode to provide a path of lithium ions. The lithium battery produces electrical energy by oxidation/reduction reactions occurring when the intercalation/deintercalation of lithium ions occurs at the cathode and the anode.

However, when the lithium battery is overcharged due to a malfunction of a charger, thereby causing a rapid rise in voltage, a large amount of lithium ions may be separated at the cathode while the intercalation of a large amount of lithium ions occurs at the anode. This thermal instability between the cathode and the anode leads to decomposition of an organic solvent contained in the electrolyte solution, rapid generation of heat, and eventually a thermal runaway phenomenon, thereby raising safety concerns.

To solve this problem, there has been tried to suppress the overcharging of the lithium battery by changing the composition of the electrolyte solution or by adding an additive to the electrolyte composition. For example, U.S. Pat. No. 5,879,834 discloses a method of enhancing the safety of a battery by using a biphenyl substance as an additive that can be polymerized at a voltage when the battery is overcharged and thus raise internal resistance. Japanese Patent Laid-open No. hei 9-17447 discloses a benzene compound that can reversibly oxide and reduce at a potential that is higher than a positive electrode potential when overcharging occurs. Japanese Patent Laid-open No. hei 5-36439 discloses the use of an electrolyte solution containing at least one of a chain carbonic ester, a cyclic carbonic ester, polypropylene carbonate (PC), and alkyl benzene in a battery system with a current cutoff device for preventing an interval voltage increase in the battery. Japanese Patent Laid-open No. hei 9-106835 discloses a non-aqueous, rechargeable lithium battery using a polymeric aromatic additive such as biphenyl, 3-chloro thiophene, franc, etc. as an additive for the electrolyte solution and a method of improving the safety of the battery. Japanese Patent Laid-open No. 2001-15155 discloses the use of an alkyl benzene derivative with a tertiary carbon near a phenyl group or cyclohexylbenzene. Hydrogen bound to the tertiary carbon is unstable and thus is easily decomposed into hydrogen gas at a high voltage, thereby initiating the operation of a current cutoff device and thus suppressing overcharging.

However, the biphenyl compound leads to accumulation of a conductive polymer inside the electrodes and on the separator when the battery is charged and discharged and an increase in the thickness of the battery, thereby causing internal shorting out during the charging/discharging cycles.

In the case of using the benzene compound, which has to be simultaneously oxidized and reduced at the cathode and the anode, a large amount of additive is required to prevent overcharging of the battery. However, the cycle lifetime or high-temperature storage characteristic of the battery deteriorates due to side reactions.

In the case of using the alkyl benzene compound to prevent overcharging, where the current cutoff device is operated by hydrogen gas produced as a reaction product, a more complicated battery system is required because overcharging cannot be prevented using the alkyl benzene compound alone.

Japanese Patent Laid-open No. 2001-15155 discloses that the amount of an additive preferably ranges from 1-5% by weight. In a polymer battery using a polymer electrolyte in which mobility of the additive is lower than in an electrolyte solution of a lithium ion battery, the amount of the additive has to be increased. However, when the amount of the additive, for example, cyclohexylbenzene, is increased above 5% by weight, the overcharging characteristic, lifespan characteristic, and swelling characteristic of the battery deteriorate.

SUMMARY OF THE INVENTION

The present invention provides an electrolyte composition with improved stability in the case of overcharging.

The present invention provides a lithium battery using the electrolyte composition.

The present invention provides a method of manufacturing the lithium battery.

According to an aspect of the present invention, there is provided an electrolyte composition comprising: a lithium salt; an organic solvent containing 15-50% by weight of propylene carbonate based on the total weight of the electrolyte composition; a nitrogen-containing compound; and cyclohexylbenzene.

According to another aspect of the preset invention, there is provided a lithium battery containing the electrolyte composition.

According to another aspect of the present invention, there is provided a method of manufacturing a lithium battery, the method comprising: injecting the electrolyte composition of any one of claims 1 through 8 into a battery container in which an anode, a cathode, and a separator are contained; and sealing the battery container.

DETAILED DESCRIPTION OF THE INVENTION

The present invention will be described in detail.

An electrolyte composition according to the present invention contains an organic solvent including 15-50% by weight of cyclohexylbenzene, a nitrogen-containing compound, and propylene carbonate (PC), which are additives that can improve stability in the case of overcharging, wherein the amount of the nitrogen-containing compound may range from 0.1 to 5% by weight and the amount of the cyclohexylbenzene may range from 0.5-10% by weight, based on the total weight of the electrolyte composition.

The nitrogen-containing compound used in the present invention suppresses earlier oxidation polymerisation of the cyclohexylbenzene by effectively removing hydrofluoric acid (HF) or a Lewis base from the electrolyte solution. The polycarbonate (PC) in the composition raises the ignition point of the organic solvent, thereby ensuring stability in the case of overcharging even when a small amount of the additive, which improves stability in the case of overcharging, is used.

Specific examples of the nitrogen-containing compound that can be used in the present invention include monomers such as a primary, secondary, or tertiary amine, and polymers, copolymers and oligomers of these amines, preferably, 6-member aromatic heterocyclic compound, and 5-member fused aromatic heterocyclic compound; and monomers such as aromatic or non-aromatic secondary or tertiary amines, and polymers, copolymers and oligomers thereof. Preferred examples of the 6-member aromatic heterocyclic compound include pyridine, pyridazine, pyrimidine, pyrazine, and triazine. Preferred examples of the 5-member fused aromatic heterocyclic compound include triazole, thiazole, and thiadiazole. The aromatic or non-aromatic secondary and tertiary amine compounds may contain at least one nitrogen atom or at least five carbon atoms.

If the amount of the nitrogen-containing compound is less than 0.1% by weight, the HF or Lewis base present in the electrolyte solution cannot be effectively captured. If the amount of the nitrogen-containing compound is greater than 5% by weight, the high-rate discharge characteristic of the battery deteriorates. If the amount of the PC is less than 15% by weight, stability not guaranteed when overcharged. If the amount of the PC is greater than 50% by weight, the PC decomposes at the anode, thereby lowering battery efficiency and capacity.

The cyclohexylbenzene used in the present invention is converted into polymers forming a film on the cathode and thus raises the internal resistance of the electrode. The energy density of the battery before an ignition reaction takes place is reduced and oxygen generated at the cathode when the battery is overcharged is less likely to contact the electrolyte solution, so that stability in the case of overcharging is improved. If the amount of the cyclohexylbenzene is less than 0.5% by weight, stability in the case of overcharging is not guaranteed. If the amount of the cyclohexylbenzene is greater than 0.5% by weight, the high-rate discharging characteristic of the battery deteriorates.

In addition to the nitrogen-containing compound and the cylcohexylbenzene, the electrolyte composition according to the present invention may further include an epoxy-containing compound. The epoxy-containing compound causes gelation of the electrolyte composition by the reaction with the nitrogen-containing compound at a high temperature. Therefore, the electrolyte composition according to the present invention can be converted into a gel polymer electrolyte by adding the epoxy-containing compound and heating the mixture. The electrolyte composition according to the present invention may contain 0.02-1.5% by weight of the epoxy-containing compound.

Specific examples of the epoxy-containing compound include 3,4-epoxycyclohexylmethyl-3',4'-epoxycyclohexane carboxylate, glycidyl dodecafluoroheptylether, butadienediepoxide, butandiol diglycidyl ether, cyclohexene oxide, cyclopentene oxide, diepoxy cyclooctane, ethylene glycol diglycidyl ether, and 1,2-epoxy hexane.

The electrolyte composition according to the present invention may further include vinylenecarbonate (VC). In this case, a battery with extended lifespan and improved capacity can be manufactured. The amount of the VC may be in a range of 0.1-0.2% by weight based on the total weight of the composition.

Any lithium salt and organic solvent that are commonly used in the field can be used for the lithium salt and the organic solvent in the electrolyte composition according to the present invention. Specific examples of the lithium salt that can be used in the present invention include $LiPF_6$, $LiAsF_6$, $LiClO_4$, $LiN(CF_3SO_2)_2$, $LiBF_4$, $LiCF_3SO_3$, and $LiSbF_6$. Examples of the organic solvent that can be used in the present invention include ethylene carbonate (EC), diethylene carbonate (DEC), propylene carbonate (PC), dimethylene carbonate (DMC), ethylmethyl carbonate (EMC), γ-butyrolactone (GBL), and a mixture of these solvents. The amount of PC used for the organic solvent may be in a range of 15-50% by weight based on the total weight of the electrolyte composition.

The electrolyte composition according to the present invention may include 0.5-2M lithium salt in the organic solvent.

The electrolyte composition according to the present invention is prepared by dissolving the amount of the above-listed additives in an organic solvent containing a lithium salt. In addition, a lithium battery including a cathode, an anode, and a separator therebetween can be manufactured using the electrolyte composition. In particular, a stack of the cathode, the anode, and the separator is rolled into a jelly roll, placed in a battery container, and sealed. The electrolyte composition is injected into the container and heated at a temperature of 30-130° C. if required, i.e., when a halogen- or epoxy-containing compound is included, to soak and gelate the electrolyte composition, thereby resulting in a complete lithium battery.

In the present invention electrodes that are commonly used for lithium ion batteries can be used. A cathode composition used in the present invention may include 100 parts by weight of a cathode active material, such as $LiCoO_2$, 1-10 parts by weight of a conducting agent, such as carbon black, 2-10 parts by weight of a binder, such as polyvinylidene fluoride (PVDF), and 30-100 parts by weight of a solvent, such as N-methylpyrrolidone (NMP). An anode composition used in the present invention may include 100 parts by weight of an anode active material, such as carbon, 10 parts or less by weight of a conducting agent, such as carbon black, 2-10 parts b weight of a binder, such as PVDF, and 30-100 parts by weight of a solvent, such as N-NMP.

Any separator that is commonly used in lithium ion batteries can be used in the present invention. A porous membrane made of a polymeric material such as polyethylene or polypropylene can be used for the separator. The container used in the present invention may be made of a thermoplastic material that does not react with the components of the battery, preferably, a material that can be thermally sealed.

The lithium battery according to the present invention may have a non-limiting shape, for example, an angular shape, a cylindrical shape, etc.

The lithium battery according to the present invention can be a lithium primary battery or a lithium secondary battery.

The present invention will be described in greater detail with reference to the following examples. The following examples are for illustrative purposes and are not intended to limit the scope of the invention.

EXAMPLES 1 THROUGH 15 & COMPARATIVE EXAMPLES 1 THROUGH 3

Preparation of Electrolyte Precursor Solutions 2 g of poly(2-vinylpyridine-co-styrene) (PVPS, available from Aldrich), 0.5 g of 1,4-butandiol diglycidylether (BDDGE, available from Aldrich), and cyclohexylbenzene (CHB, available from Aldrich)) serving as an additive that can enhance stability to overcharging were dissolved in a 1M $LiPF_6$-containing solvent mixture of EC, DEC, and PC to prepare an electrolyte precursor solution. The amounts of the PVPS, BDDGE, and lithium salt were constant and the ratio of EC to DEC by weight was fixed at 0.66 whereas the amounts of the PC and the CHB were varied as in Table 1.

<Manufacture of Lithium Batteries>

Initially, a cathode composition was prepared by mixing 100 parts by weight of $LiCoO_2$, 3 parts by weight of binder PVDF, and 3 parts by weight of conducting agent carbon black for improving mobility of electrons. 90 parts by weight of N-methylpyrrolidone (NMP) and ceramic balls were added to the mixture and mixed in a 200-mL plastic bottle for 10 hours. The cathode composition was cast onto a 15-μm-thick aluminum foil using a 250-μm-doctor blade and dried in an oven at about 110° C. for about 12 hours until the NMP was fully vaporized. The resultant structure was roll-pressed and cut to a predetermined size to obtain a cathode plate having a thickness of 95 μm.

An anode composition was prepared by mixing 100 parts by weight of carbon (natural carbon), 3 parts by weight of conducting agent carbon black, and 3 parts by weight of polyvinylidene fluoride. 90 parts by weight of N-NMP and ceramic balls were added to the mixture and mixed for about 10 hours. The anode composition was cast onto a 12-μm-thick copper foil using a 300-μm-doctor blade and dried in an oven at about 90° C. for about 10 hours. The resultant structure was roll-pressed and cut to a predetermined size to obtain an anode plate having a thickness of 120 μm.

A polyethylene/polypropylene porous membrane (Celgard Co., U.S.A.) having a thickness of 20 μm was used as a separator.

The cathode plate and the anode plate with the porous membrane therebetween were rolled to manufacture a battery assembly. This jelly-roll type battery assembly was placed in an aluminum-laminated battery container, and each electrolyte composition prepared in Examples 1 through 13 and Comparative Examples 1 through 3 was injected into the case to obtain a complete, 1100 mAh-grade lithium secondary battery.

The overcharging characteristic, capacity, high-rate characteristic at 1 C and 2 C were measured using the batteries. The results are shown in Table 1.

TABLE 1

| Example | Organic Solvent | Amount (weight %) | Overcharging (6 V, 1 C) | Overcharging (6 V, 2 C) | Capacity (mAh) | High-rate characteristic C(2 C)/C(0.2) |
|---|---|---|---|---|---|---|
| Example 1 | PC/CHB | 15/1.5 | Passed | Failed | 1153 | 91.5 |
| Example 2 | PC/CHB | 25/1.5 | Passed | Passed | 1157 | 92.7 |
| Example 3 | PC/CHB | 35/1.5 | Passed | Passed | 1151 | 91.6 |
| Example 4 | PC/CHB | 40/1.5 | Passed | Passed | 1148 | 89.5 |
| Example 5 | PC/CHB | 25/0.5 | Passed | Failed | 1153 | 93.6 |
| Example 6 | PC/CHB | 25/1.0 | Passed | Passed | 1158 | 91.3 |
| Example 7 | PC/CHB | 25/1.5 | Passed | Passed | 1155 | 92.2 |
| Example 8 | PC/CHB | 25/2.0 | Passed | Passed | 1153 | 91.9 |
| Example 9 | PC/CHB | 25/3.0 | Passed | Passed | 1151 | 90.7 |
| Example 10 | PC/CHB | 25/5 | Passed | Passed | 1140 | 86.8 |
| Example 11 | PC/CHB/VC | 25/1.5/0.5 | Passed | Passed | 1150 | 98.7 |
| Example 12 | PC/CHB/VC | 25/1.5/1.0 | Passed | Passed | 1155 | 98.6 |
| Example 13 | PC/CHB/VC | 25/1.5/2.0 | Passed | Passed | 1152 | 97.9 |
| Comparative Example 1 | PC/CHB | 0/1.5 | Failed | Failed | 1159 | 93.7 |
| Comparative Example 2 | PC/CHB | 5/1.5 | Failed | Failed | 1160 | 92.3 |
| Comparative Example 3 | PC/CHB | 25/0 | Passed | Failed | 1156 | 92.5 |

As is apparent from the results in Table 1, the batteries are stable when overcharged at an amount of cyclohexylbenzene that is greater than 0.5% by weight and at an amount of PC that is greater than 15% by weight. However, stability in the case of overcharging is not guaranteed when the amount of cyclohexylbenzene is 0.5% or less by weight and the amount of PC is 15% or less by weight. The additives do not affect the lifespan and high-temperature storage characteristic of batteries even when the amounts are increased, so that the additives can be effectively used for manufacturing commercial batteries.

A lithium battery manufactured using the electrolyte composition according to the present invention has improved stability when overcharged and improved cycle characteristics.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An electrolyte composition comprising:
   a lithium salt;
   an organic solvent containing 15-50% by weight of propylene carbonate based on the total weight of the electrolyte composition;
   a nitrogen-containing compound selected from the group consisting of monomers, polymers, copolymers and oligomers of pyridine; and
   cyclohexylbenzene;
   the nitrogen-containing compound serving to suppress earlier oxidation polymerization of the cyclohexylbenzene.

2. The electrolyte composition of claim 1, wherein the amount of the nitrogen-containing compound ranges from 0.1% to 5% by weight and the amount of the cyclohexylbenzene ranges from 0.5% to 10% by weight based on the total weight of the composition.

3. The electrolyte composition of claim 1, wherein the nitrogen-containing compound is poly (2-vinylpyddine-co-styrene.

4. The electrolyte composition of claim 1 further comprising at least one compound selected from the group consisting of an epoxy-containing compound and vinylene carbonate.

5. The electrolyte composition of claim 4, wherein the amount of the epoxy-containing compound ranges from 0.02% to 1.5% by weight based on the total weight of the electrolyte composition.

6. The electrolyte composition of claim 1, wherein the lithium salt is selected from the group consisting of $LiPF_6$, $LiAsF_6$, $LiClO_4$, $LiN(CF_3SO_2)_2$, $LiBF_4$, $LiCF_3SO_3$, and $LiSbF_6$, and the concentration of the lithium salt in the organic solvent ranges from 0.5M to 2.0M.

7. A method of manufacturing a lithium battery, the method comprising:
   injecting the electrolyte composition of claim 1 into a battery container in which an anode, a cathode, and a separator are contained; and
   sealing the battery container.

8. The method of claim 7 further comprising heating the container at a temperature of 30-130° C. after the sealing to gelate the electrolyte composition.

9. A lithium battery manufactured according to the method of claim 7.

10. The lithium battery of claim 9 comprising a gel polymer electrolyte between the anode and the cathode, the gel polymer electrolyte being obtained by gelating the electrolyte composition.

11. A lithium battery containing the electrolyte composition of claim 1.

* * * * *